(12) United States Patent
Soldati

(10) Patent No.: US 10,645,702 B2
(45) Date of Patent: May 5, 2020

(54) METHOD AND SYSTEM FOR MUTING RADIO RESOURCES IN A WIRELESS COMMUNICATION SYSTEM

(71) Applicant: HUAWEI TECHNOLOGIES CO., LTD., Shenzhen (CN)

(72) Inventor: Pablo Soldati, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 15/169,864

(22) Filed: Jun. 1, 2016

(65) Prior Publication Data

US 2016/0278101 A1 Sep. 22, 2016

Related U.S. Application Data

(63) Continuation of application No. PCT/EP2013/075262, filed on Dec. 2, 2013.

(51) Int. Cl.
*H04W 72/08* (2009.01)
*H04J 11/00* (2006.01)
(Continued)

(52) U.S. Cl.
CPC ....... *H04W 72/082* (2013.01); *H04J 11/0056* (2013.01); *H04W 48/02* (2013.01);
(Continued)

(58) Field of Classification Search
None
See application file for complete search history.

(56) References Cited

U.S. PATENT DOCUMENTS

2011/0230144 A1 9/2011 Siomina et al.
2011/0244877 A1 10/2011 Farajidana et al.
(Continued)

FOREIGN PATENT DOCUMENTS

JP 2013-98989 5/2013
JP 2013-219700 10/2013
(Continued)

OTHER PUBLICATIONS

International Search Report dated Mar. 13, 2014 in corresponding International Patent Application No. PCT/EP2013/075262.
(Continued)

*Primary Examiner* — Brandon M Renner
(74) *Attorney, Agent, or Firm* — Slater Matsil, LLP

(57) ABSTRACT

The present invention relates to a method for muting transmission from at least one network node in a wireless communication system, said wireless communication system comprising a plurality of network nodes (n=1, ..., N) for providing access to user nodes. The method comprises, when transmission from a first network node (n) of said wireless communication system is to be muted:
determining, for said first network node (n), a first portion of time ($\rho_n$) for muting transmission from said first network node (n) at least partly based on a first condition relating to at least one second network node (j); and
based on said first portion of time ($\rho_n$), determining a first muting pattern for muting transmission from said first network node (n).

19 Claims, 3 Drawing Sheets

(51) Int. Cl.
*H04W 52/24* (2009.01)
*H04W 72/12* (2009.01)
*H04W 48/02* (2009.01)
*H04W 72/04* (2009.01)
*H04W 16/10* (2009.01)

(52) U.S. Cl.
CPC ..... *H04W 52/243* (2013.01); *H04W 72/0446* (2013.01); *H04W 72/0453* (2013.01); *H04W 72/1226* (2013.01); *H04W 16/10* (2013.01)

(56) References Cited

U.S. PATENT DOCUMENTS

| | | |
|---|---|---|
| 2012/0113843 A1 | 5/2012 | Watfa et al. |
| 2013/0107798 A1 | 5/2013 | Gao et al. |
| 2013/0223416 A1 | 8/2013 | Michel |
| 2013/0272274 A1 | 10/2013 | Ishida et al. |
| 2013/0329636 A1 | 12/2013 | Jiang et al. |
| 2014/0187255 A1* | 7/2014 | Dimou ................ H04W 72/082 455/452.2 |
| 2014/0187263 A1 | 7/2014 | Geng et al. |
| 2015/0065108 A1* | 3/2015 | Bedekar ................ H04W 24/02 455/418 |
| 2015/0119053 A1 | 4/2015 | Morimoto et al. |
| 2015/0131553 A1* | 5/2015 | Centonza ............. H04W 24/10 370/329 |
| 2015/0208263 A1* | 7/2015 | Behravan ............... H04B 7/024 370/252 |
| 2016/0021621 A1* | 1/2016 | Wu ..................... H04W 52/244 370/311 |
| 2016/0066293 A1* | 3/2016 | Siomina ................ G01S 5/0226 370/328 |
| 2016/0066315 A1* | 3/2016 | Zhang ............... H04W 72/1226 370/329 |
| 2016/0183266 A1* | 6/2016 | Dinan .................. H04B 7/2656 370/280 |
| 2016/0211955 A1* | 7/2016 | Wu ....................... H04W 24/02 |

FOREIGN PATENT DOCUMENTS

| | | |
|---|---|---|
| JP | 2013-236261 | 11/2013 |
| JP | 2013-541920 | 11/2013 |
| WO | 2013/013954 A1 | 1/2013 |
| WO | 2013/023517 A1 | 2/2013 |
| WO | 2013/045981 A1 | 4/2013 |
| WO | 2013/142557 A1 | 9/2013 |

OTHER PUBLICATIONS

"Details of almost blank subframes", 3GPP TSG-RAN WG1 Meeting #62bis, Ericsson, ST-Ericsson, R1-112648, Xian, China, Oct. 11-15, 2010, pp. 1-6.
"On scenarios for further time domain ICIC evaluations", 3GPP TSG-RAN WG1 Meeting #66, Ericsson, ST-Ericsson, R1-105335, Athens, Greece, Aug. 15-19, 2011, pp. 1-4.
"Final Report of 3GPP TSG RAN WG1 #67 v1.0.0 (San Francisco, USA, Nov. 14-18, 2011)", 3GPP TSG RAN WG1 Meeting #68, MCC Support, R1-120001, Dresden, Germany, Feb. 6-10, 2012, pp. 1-89.
International Search Report dated Mar. 13, 2014, in corresponding International Application No. PCT/EP2013/075262.
Japanese Office Action dated Aug. 22, 2017 in corresponding Japanese Patent Application No. 2016-535699.
"Discussion on $1^{st}$ ABS pattern bitmap for TDD," CMCC, 3GPP TSG-RAN WG1 #63, Jacksonville USA, Nov. 15-19, 2010, R1-106315.
"Solutions for the macro-pico interference scenario," ETRI, 3GPP TSG-RAN WG3 Meeting #73bis, Zhuhai, China, Oct. 10-14, 2011, R3-112439.
"$3^{rd}$ Generation Partnership Project; Technical Specification Group Radio Access Network; Evolved Universal Terrestrial Radio Access Network (E-UTRAN); X2 application protocol (X2AP) (Release 10)," 3GPP TS 36.423 V10.4.0, Dec. 2011.
"On signaling support for reduced power ABS," ZTE, 3GPP TSG RAN WG1 Meeting #69, Prague, Czech Republic, May 21-25, 2012, R1-123002.

* cited by examiner

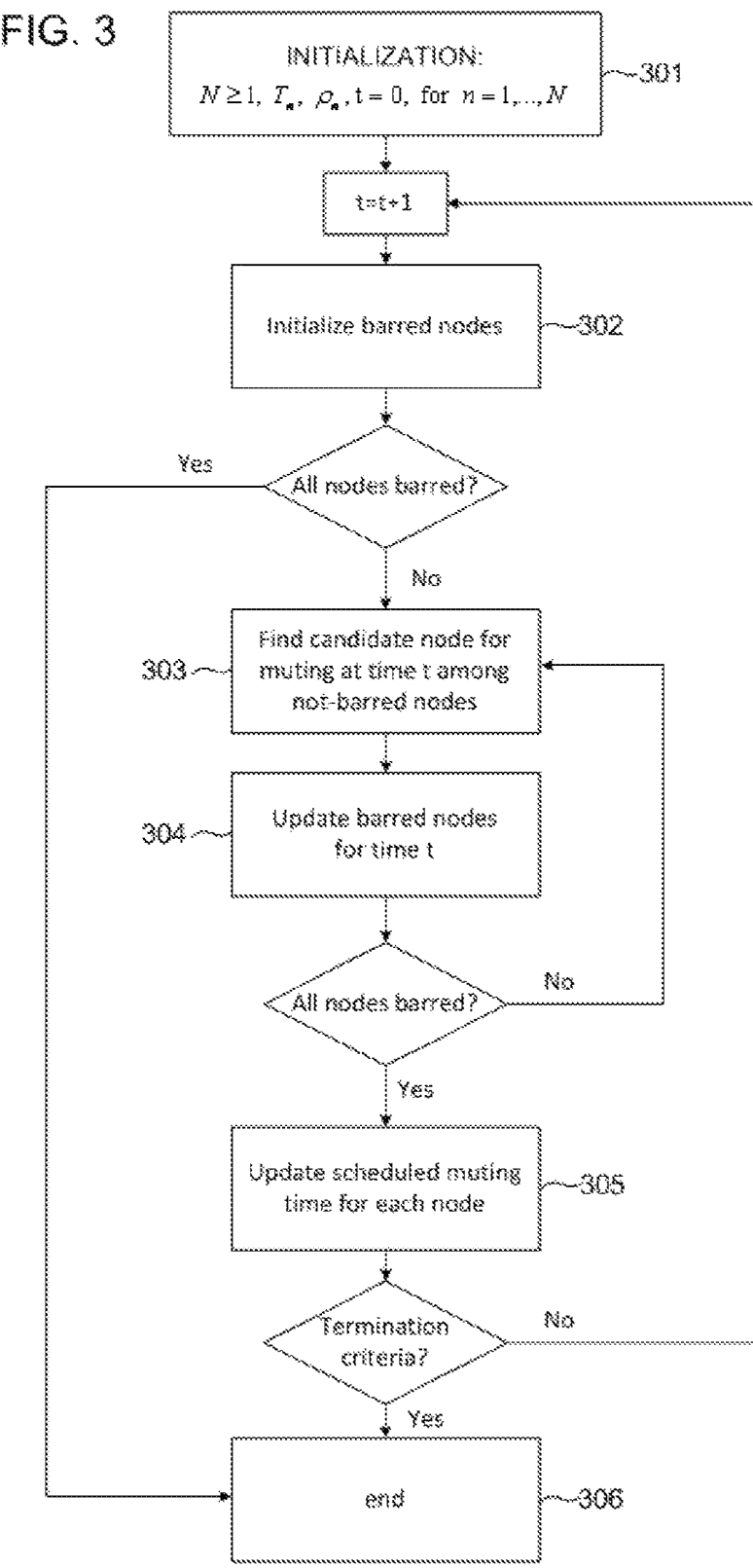

METHOD AND SYSTEM FOR MUTING RADIO RESOURCES IN A WIRELESS COMMUNICATION SYSTEM

CROSS-REFERENCE TO RELATED APPLICATIONS

This application is a continuation of International Application No. PCT/EP2013/075262, filed on Dec. 2, 2013, which is hereby incorporated by reference in its entirety.

TECHNICAL FIELD

The present invention relates to a method for muting radio resources in a wireless communication system. The invention also relates to a corresponding system, a network node, a computer program, and a computer program product.

BACKGROUND OF THE INVENTION

Radio interference is a major cause of performance degradation in wireless radio systems. In order to mitigate radio interference and enhance performance of the system, wireless radio systems have adopted Inter-Cell Interference Coordination (ICIC) schemes in frequency domain and/or time domain.

With regard to frequency domain, ICIC relates to spatial reuse of the frequency spectrum and transmission power at network nodes (e.g. base stations). Current methods include:
  Full frequency reuse, e.g. the basic operating mode of the LTE system, in which each base station uses the entire frequency spectrum with uniform power distributed across the system bandwidth, thereby creating strong interference to cell edge users.
  Hard frequency reuse, used e.g. in GSM and LTE Rel 8-9, in which each base station operates in one out of a set of non-overlapping portions of the available frequency spectrum in such a way that neighboring base stations do not use the same set of frequencies. While this mitigates the interference at the cell-edge, the overall spectral efficiency is reduced by a factor proportional to the frequency reuse factor.
  Fractional frequency reuse in which the available frequency spectrum is divided into two portions. One portion is common to all base stations and is used for scheduling cell-center users. A second portion is divided among base stations in a hard frequency reuse manner and used to schedule transmission to/from cell-edge users.
  Soft frequency reuse enables base stations to transmit in the entire frequency spectrum with different power levels: higher transmission power in the portion of the spectrum where cell-edge users are scheduled; lower transmission power in the portion of spectrum where cell-center users are scheduled.

With regard to the time domain, ICIC consists of muting the transmission from a base station in certain time resources to mitigate interference exhibited by mobile stations served by other base stations. For example, in LTE heterogeneous networks a macro base station (eNodeB) configures almost blank subframe (ABS) patterns to reduce interference for transmissions of pico-cells within the macro base station coverage area. In this case downlink subframes are configured where only necessary signals to avoid radio link failure or to maintain backward compatibility are transmitted, such as common reference signals, primary and secondary synchronization signals (PSS/SSS), physical broadcast channel (PBCH), SIB-1 and paging with their associated PDCCH. User data is not transmitted.

Almost blank subframes (ABS) was adopted in LTE Rel-10 to mitigate interference in heterogeneous deployments and comprise time-domain muting (TDM) patterns of data transmission in downlink subframes. The muting pattern of the aggressor cell (i.e., the macro-eNodeB) is signalled over the X2 interface to the victim cells, i.e. pico-eNodeBs within the macro-eNodeB coverage area, so that victim cells can schedule communication with users suffering strong interference from the aggressor cell in the ABS subframes. The time domain muting patterns are configured semi-statically by means of bitmaps representing up to four radio frames.

Mobile (user) nodes in the coverage area of the victim cell are configured to perform channel quality (CSI) measurements in correspondence of both ABS and non-ABS resources so as to enable the serving cell to determine whether or not the mobile station is affected by strong interference from the aggressor cell.

Another method to mitigate interference in the downlink of a cellular radio system is by utilizing transmission beamforming. In essence, in a multi-antenna system a base station may fine-tune the transmission of a downlink radio signal into a narrow beam in the direction of the intended receiver by means of transmission precoding thereby reducing the interference caused to other user nodes in the cell coverage area.

Mobile devices (user nodes) can be arranged to determine whether being interfered by a neighboring cell. An interference condition may occur upon detection that a quality of a neighboring cell becomes better than a quality of the serving cell by a threshold or for a certain period.

The above concept of ABS has also been used in transmission beam coordination. In particular, it provides a method for beam coordination between an aggressor base station and a victim base station, where the interference created by a beam transmitted by an aggressor base station is measured by mobile stations in the served area of a victim base station. Depending on the measured interference, a restriction of use of radio resources is determined for the aggressor base station, which is used by the victim base station to schedule users in restricted radio resources as in the ABS case.

A mobile station in the victim cell reports which beams are deemed as interfering and eventually a corresponding channel quality measure. Based on this information, the victim cell performs a ranking of interfering beams, and determines a scheduling of the served users based on muted/restricted resources as signaled by an aggressor cell. The aggressor cell determines a restriction of usage of radio resources based on the ranking of interfering beams at the victim cell.

SUMMARY OF THE INVENTION

It is an object of the present invention to provide a solution which mitigates or solves drawbacks and problems of prior art solutions.

According to the present invention it is provided a method for muting transmission from at least one network node in a wireless communication system, said wireless communication system comprising a plurality of network nodes for providing access to user nodes. The method comprises, when transmission from a first network node of said wireless communication system is to be muted:

determining, for said first network node, a first portion of time for muting transmission from said first network node at least partly based on a first condition relating to at least one second network node; and based on said first portion of time, determining a first muting pattern for muting transmission from said first network node.

As stated above, radio interference is a major cause of performance degradation in wireless radio systems, and to mitigate radio interference and enhance performance of the system wireless radio systems have adopted Inter-Cell Interference Coordination (ICIC) schemes.

The present invention relates mainly to time domain ICIC, and according to the above transmission can be muted by the use of almost blank subframes (ABS) in order to mitigate interference in heterogeneous networks. However, existing solutions utilizing transmission of almost blank subframes (ABS) in order to mitigate interference have the disadvantage that the TDM muting patterns are independently determined by the network node causing the interference, while the scheduling decisions are independently determined by the network node experiencing interference. Furthermore, the prior art solutions only considers a single dominant source of interference, the macro-eNodeB.

Massive densification is expected in future radio access networks. However, densification of access nodes in radio networks makes inter-cell interference management difficult due to the presence of a potentially large number of interferers (aggressor nodes) per unit area affecting the transmission to/from user (mobile) nodes. Interference in dense deployments can be mitigated by silencing, muting, the transmission of the interfering network nodes when a user node is served by the network.

The present invention relates to such interference mitigation, and according to the invention, it is determined a first portion of time in which transmission from a first network node is to be muted. This first portion of time can be determined as a portion, e.g. the percentage of some suitable period of time that transmission from the first network node is to be muted. The first portion of time for muting transmission from said first network node is determined at least partly based on a first condition relating to at least one second network node, and this condition can, for example, be a representation of the interference caused by said first network node within the serving area of said at least one second network node.

A muting pattern for muting transmission from said first network node is then determined based on said first portion of time. The muting pattern can be determined based on the determination of a muting pattern for at least one other network node or muting patterns for a plurality of network nodes. Consequently, muting patterns can be determined taking muting patterns of other networks into consideration, so that efficient muting can be performed, and the muting patterns can be optimized using an optimization algorithm.

Also, a second portion of time for muting transmission from a second network node can be determined, and based on said second portion of time a second muting pattern for muting transmission from said second network node can be determined. The determination of said first and/or second portion of time can be dependent on the determination of the other of said first and second portion of time.

The invention has the advantage that the portion of time that transmission of a first network node is muted can be adapted to current conditions in interfered areas, e.g. by taking network loads in interfered areas into account.

Furthermore, an optimal portion of time that the transmission of a network node should be muted can be determined by solving an optimization problem as exemplified below, where this portion of time can be determined in relation to the interference that the node creates to service areas of other network nodes, and/or in relation to the service said network node shall provide within its service area, and/or in relation to portion of time the transmission of neighboring network nodes is muted.

A suitable transmission muting pattern can then be determined based on the determined portion of time, and transmission muting patterns among a plurality of network nodes that create interference on each other's service area can be coordinated to optimize interference mitigation.

The present invention is particularly useful in denser deployments of radio access nodes having similar power output, such as, for example, the dense small-cell deployment in LTE system or ultra-dense deployments in future radio access networks, where each base station has multiple dominant interfering cells affecting different portions of the coverage area. Prior art solutions for determining time domain muting patterns are ineffective in these kinds of systems. The present invention allows coordination among base stations (network nodes) which is of paramount importance for interference mitigation.

The present invention further has the advantage that the muting pattern of at least one network node can be determined by first considering the interaction among multiple network nodes, so that portions of time for muting interfering network nodes can be determined and whereafter the operation of each network node can be optimized by determining suitable, and also optimized, muting patterns for the network nodes.

BRIEF DESCRIPTION OF THE DRAWINGS

The appended drawings are intended to clarify and explain different embodiments of the present invention in which:

FIG. 3 illustrates an algorithm for determining muting patterns according to the invention.

DETAILED DESCRIPTION OF THE INVENTION

The present invention relates to inter-cell coordination of radio resource muting among a plurality of network nodes in a wireless communication system comprising a plurality of network nodes for providing network access to a plurality of user nodes.

According to the above, time domain muting patterns have been applied in LTE heterogeneous networks. However, due to the significant difference between the transmission power of a macro-eNodeB (roughly 46 dBm) and a pico-eNodeB (roughly 30 dBm), time domain muting patterns have been applied only to the macro-eNodeB. In other words, the related art LTE heterogeneous network assumes a single dominant aggressor eNodeB generating interference to mobile stations served by all pico-eNodeB.

Moreover, there is no coordination in the way almost blank subframe (ABS) patterns are determined by the macro-eNodeB or used by a (victim) pico-eNodeB to schedule mobile stations in its coverage area. Coordination is limited to signaling the ABS patterns from a macro-eNodeB or other interference indicators (e.g., the overload indicator OI and the high interference indicator HII in the LTE system) reporting whether specific time-frequency radio resources suffer high, low or medium interference.

Furthermore, with regard to transmission beam coordination exemplified above, coordination is limited to the exchange of information among a victim and an aggressor base station (namely, a ranking of interfering beams and restriction of resource use, respectively), whereas local decisions are taken at the victim and the aggressor base stations (related to ranking of interfering beams and scheduling of served user terminals and the restriction of usage of radio resources for ranked interfering beams, respectively) without coordination. That is, there is no coordination in the determination of the restriction of usage between the aggressor and victim cell, i.e., the aggressor cell determines a restriction of usage of radio resources (e.g. tx muting) independently on whether or not the victim cell has also a restriction of usage.

Figure 1:
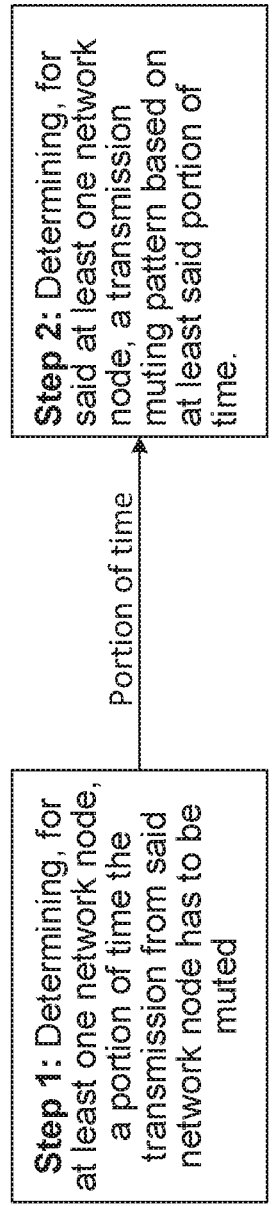
FIG. 1 illustrates a method in a wireless communication system according to an embodiment of the present invention.

The present invention provides a method for muting transmission from at least a first network node, which can be performed in a coordinated manner, and a method according to the invention is shown in FIG. 1. According to a first step it is determined, for said first network node, a first portion of time to mute transmission from said first network node, the determination being based on a condition relating to another network node in the wireless communication system. According to a second step a muting pattern for muting transmission from said first network node is then determined based on said first portion of time.

Figure 2:
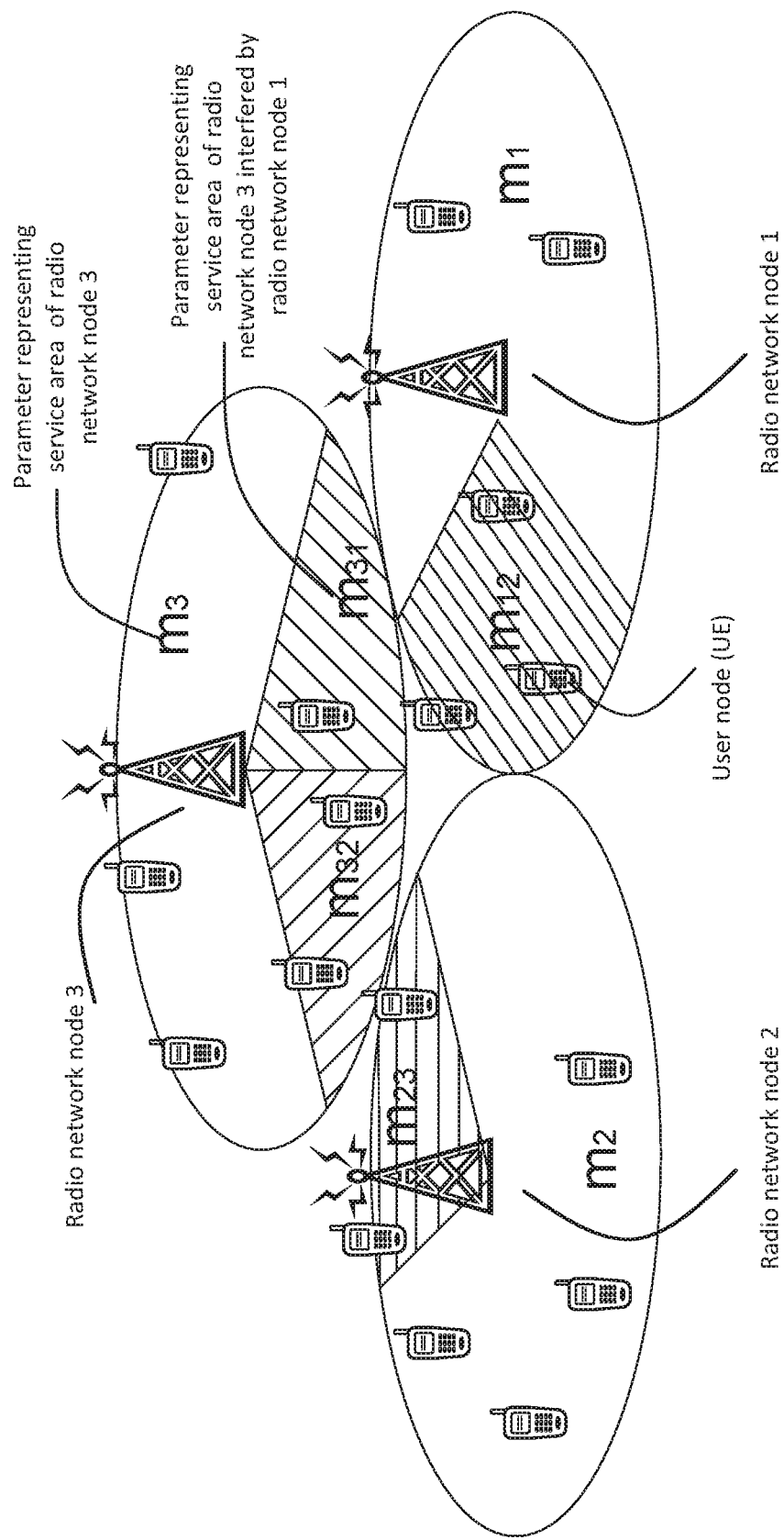
FIG. 2 shows an example of a wireless radio communication system in which the present invention can be utilized.

The invention will be further exemplified in connection to FIG. 2, which illustrates an exemplary embodiment of the present invention.

In the present description terminology from the 3GPP LTE system (such as subframe, eNodeB, etc.) is occasionally used, but as is realized by the skilled person more general notations of channels, signals, network entities etc may interchangeably be used, and the invention is applicable in all wireless communication systems being capable of employing muting patterns for muting transmission of network nodes.

With regard to muting transmission, the term mute or muting, in this context, means that the network node is not transmitting at least part of the information/data that otherwise would be transmitted had the transmission not been muted. The transmission is often carried out in a plurality of channels, and consequently one way of muting the transmission is to stop transmission in regard of one or more channels. For instance, in LTE, muting the transmission of an eNodeB by using almost blank subframes (ABS) means that the downlink shared data channel (PDSCH) is not transmitted, while still transmitting downlink control channel (E)PDCCH and downlink reference signals. According to one embodiment, transmission is muted using almost blank subframes (ABS).

According to one embodiment, the transmission can be muted by on/off power control, i.e., a network node either transmits power associated to at least one data channel or, when muted, not transmitting. On a longer time-scale, muting the transmission of a network node can be interpreted as entering a discontinuous transmission (DTX) state in which a network node does not transmit at least any data channel in the downlink for longer periods of time (hundreds of milliseconds to seconds).

Transmission muting can also be accomplished by reducing transmission power, i.e., transmission need not be turned off or stopped for e.g. one or more channels, but can be muted in terms of reducing transmission power instead, where this reduction can be individual for individual network nodes, and e.g. be determined based on perceived interference in other network nodes, and where such information can be communicated to the interfering network node/and or the network node responsible for determining muting patterns according to the present invention.

Furthermore, the transmission muting can be arranged to mute a network node in the full frequency spectrum in which the network node operates. According to one embodiment, however, transmission muting is determined in relation to a set of time-frequency resources. That is, the transmission can be arranged to be muted only in some parts of the frequency spectrum, and the transmission muting pattern according to the invention may indicate which time-frequency resources that are to be muted. For example, with reference to LTE, it can be determined which physical resource blocks (PRBs) in which subframes that are to be muted.

The present invention provides a method for determining a muting pattern of at least one network node, and according to the invention, this can be accomplished by solving two sub-problems that enable the interaction among multiple network nodes to be considered, and therefore optimize the operation of each network node. The portion of time to mute a network node can first be established, and a suitable muting pattern, which can take muting patterns of other network nodes into account, can be determined when the portion of time has been established.

Also, the determination of the portion of time to mute a network node takes conditions of at least one second network node into account.

FIG. 2 shows an example of a wireless radio communication system, e.g. an LTE system or any other suitable system in which the present invention can be utilized. The figure shows three network nodes 1, 2, 3 for providing access to user nodes. The network nodes can consist of base stations such as eNodeBs in an LTE system. As is realized, a communication system, in general, comprises a plurality of network nodes for providing access to the communication system. However, for simplicity only three network nodes 1, 2, 3 are shown in FIG. 2. The figure further discloses a number of user nodes, UEs, at least some of which communicating with the network nodes. The user nodes can consist of any suitable user communication device, such as: mobile phones, mobile communication devices, actuator devices, portable computers, stationary computers, sensor devices, devices for machine-type communication, and devices for machine-to-machine communication.

The network nodes 1, 2, 3 provide service in service areas $m_1$, $m_2$, $m_3$, respectively. In at least some parts of the service areas $m_1$, $m_2$, $m_3$ transmissions from network nodes and/or user nodes interfere with transmissions from network nodes and/or user nodes in service areas of other network nodes. This is illustrated by areas $m_{12}$, $m_{23}$, $m_{31}$, $m_{32}$, where, for example, area $m_{32}$ represents the part of the service area of network node 3 that is interfered by transmissions in the service area of network node 2. Correspondingly, area $m_{23}$ represents the part of the service area of network node 2 that is interfered by transmissions in the service area of network node 3, etc.

According to the invention, the portion of time that the transmission of a first network node, e.g. network node 3, is to be muted is determined in relation to a condition relating to another network node in the system. For example, this condition can consist of one of the following alternatives:

the interference that the first network node, e.g. network node 3, generates within the serving area of at least a second network node, such as the interference that is caused by network node 3 in area $m_{23}$ of network node 2;

the interference that at least one second network node generates within the service area of at least said first network node. For example, the interference that is caused by network node 2 in area $m_{32}$ of network node 3.

the amount and/or type of traffic at least a second network node provides within its service area. For example, the muting of network node 3 can be dependent on the traffic in network node 2. High traffic loads in the service area of network node 2, in particular in area $m_{23}$, can have an increasing impact on the portion of time that the transmission of said first network node (3) is muted, and vice versa.

the portion of time the transmission of at least one second network node is muted. The portions of time for muting transmissions of network nodes can be determined in dependence of determination portions of time for muting other network nodes. For example, the portion of time for muting the network node 3 can depend on determinations of portions of time for muting network nodes 1 and 2. The portions of time for muting transmissions of network nodes can be arranged to be jointly determined as described below, e.g. by optimization, or be determined in sequence.

The determination can further take the amount and/or type of traffic said first network node supports within its own service area into account when determining the portion of time for muting transmission. For example, when traffic is high in the service area of a network node that is to be muted, this can impose a maximum for the portion of time that the network node can be muted.

An exemplary embodiment for determining portion of time for muting transmissions from network nodes in a general case is disclosed in the following. In the exemplary embodiment it is assumed a communication system comprising a plurality N>1 of radio access nodes for providing access to the network to user nodes. The radio access nodes are in the following referred to as network nodes, and are labeled n=1, . . . , N.

For each network node n, a parameter $m_n$ is used to characterize service area of network node n according to the above, while a second parameter $m_{n,j}$ represents the extent to which, such as e.g. portion of, $m_n$ is being interfered by the transmission of a second network node j. It is apparent to the skilled reader that these parameters can represent either quantities in absolute values or normalized quantities. As explained above, FIG. 2 shows an illustration of these parameters for the case of three radio network nodes.

In one embodiment, parameter $m_n$ representing the traffic and/or the service area of a network node n is represented by one or more in the group consisting of:

the (average) number of user nodes served by the network node, the (average) number active user nodes within the service area, the (average) traffic supported in the service area, the (average) traffic demand in the service area.

As is realized, further representations are possible. Consequently, for the above example, the parameter $m_{n,j}$ can represent one or more in the group of:

the (average) number of user nodes served by the network node n and interfered by network node j, the (average) number active user nodes within the service area of network node n interfered by network node j, the (average) traffic supported in the service area of network node n interfered by network node j, the (average) traffic demand in the service area of network node n interfered by network node j.

According to one embodiment of the invention, a maximum of the portion of time $\rho_n$ that the transmission of a network node n is to be muted is imposed. For example, it is usually not desired that a first network node currently serving user nodes is completely muted although such muting would be beneficial from the point of view of interfered network nodes. For this reason, the maximum allowable portion of time $\rho_n$ that the transmission of a network node n is to be muted can be limited, e.g., by one of the following values:

$$\rho_{n,max} = 1 - \frac{m_n}{m_n + \max_{j \neq n} m_{j,n}}, \quad (1)$$

$$\rho_{n,max} = 1 - \frac{m_n}{m_n + \min_{j \neq n} m_{j,n}}, \quad (2)$$

$$\rho_{n,max} = 1 - \frac{m_n}{m_n + avg\{m_{j,n}\}}. \quad (3)$$

where the term $m_{n,j}$ represents the interference caused by the network node n within the service area of a second network node j.

The first expression (1) is beneficial for low-loaded systems, with the term $$m_n + \max_{j \neq n} m_{j,n}$$

representing the time that the network node n needs to be active to provide the required service within its service area plus the time the transmission from said network node should be muted to mitigate the interference created in regard of service provided by all neighbouring network nodes j.

The second expression (2) is beneficial for high load systems, in which case the term $$m_n + \min_{j \neq n} m_{j,n} \left( \min_{j \neq n} m_{j,n} \text{ determined for positive terms of } m_{j,n} \right)$$

assures that the cell is not switched off for too long time.

The third expression (3) is beneficial for a system with intermediate load, where the term $$avg\{m_{j,n}\}_{j \neq n}$$

represents an average of the coefficients $m_{j,n}$, with j=1, . . . , N and j≠n.

The described example provides a low-complexity estimation of the portion of time that the transmission from a network node shall be deactivated for different system loads.

According to a previous embodiment, the quantity $\rho_{n,max}$ represents an estimate of the maximum portion of time that a first network node is to be muted which has been determined in relation to the service said first network node provides within its service area and the interference said first network node generates within the serving area of at least a second network node.

According to one embodiment of the invention, the mutual interaction between a first network node n and a second network node j is represented by an incidence matrix $A=[a_{n,j}]_{n,j=1}^{N}$ whose entry $a_{n,j}=1$ if a criterion representing said interaction between the network nodes n and j is fulfilled, and $a_{n,j}=0$ otherwise. A suitable criterion representing the relation between two network nodes n and j with regard to interaction is the mutual interference created on one other's service area or served traffic. Therefore, according to one embodiment of the invention, $a_{n,j}=1$ if $m_{n,j}>0$, and $a_{n,j}=0$ otherwise. More generally, the interference generated by a first network node within the service area of at least one second network node can be represented in terms of an incidence matrix $A=[a_{n,j}]_{n,j=1}^{N}$ according to any of the following criteria:

- $a_{n,j}=1$ if the transmission from the network node j creates interference to the service area of network node n, and $a_{n,j}=0$ otherwise;
- $a_{n,j}=1$ if the transmission from the network node j creates interference to at least one mobile node served by network node n, and $a_{n,j}=0$ otherwise;
- $a_{n,j}=1$ if the transmission from the network node j creates interference to at least a certain portion of the user nodes served by network node n, and $a_{n,j}=0$ otherwise;
- $a_{n,j}=1$ if the transmission from the network node j creates interference to at least a portion of traffic served by network node n, and $a_{n,j}=0$ otherwise;
- $a_{n,j}=1$ if the operation in the service area of a network node j creates interference in the service area of a network node n, and $a_{n,j}=0$ otherwise;
- $a_{n,j}=1$ if the traffic served by a network node j creates interference in the service area of a network node n, and $a_{n,j}=0$ otherwise.

This method has the advantage that the way in which the transmission of a network node affects a plurality of other network nodes can be represented in a compact manner. A further advantage is that it can be used when determining the portion of time a network node has to be muted in relation to the interference it produces to the service area and/or traffic of other network nodes.

According to one exemplary embodiment, the portion of time that the transmission of a plurality of N>1 network nodes is to be muted can be computed as the solution of the following optimization problem:
maximize $$\alpha \sum_{n} \rho_n + (1-\alpha) \sum_{n} \log(\rho_n) \quad (4)$$

subject to $$\rho_n + \sum_{j \neq n} \alpha_{n,j} \rho_j \leq 1, \forall n, \quad (5)$$

where $\rho_n$ is constrained by the constraints $\rho_{n,min} \leq \rho_n \leq \rho_{n,max}$, $\forall n$ and $\rho_{n,min}, \rho_{n,max} \in (0,1]$, and further $0<\rho_{n,min}\leq 1$, $0<\rho_{n,max}\leq 1$ and $\alpha \in [0,1]$.

In this example, $\rho_n$ represents the normalized portion of time of some period of time T that the transmission from a network node n shall be muted, while the quantities $0<\rho_{n,min}\leq 1$ and $0<\rho_{n,max}\leq 1$ denotes a lower and an upper bound on the variable $\rho_n$, respectively. The objective function is a convex combination of two terms, where the parameter $\alpha \in [0,1]$ allows a trade-off between different operating points of the system.

In one example, $\alpha=0$ determining a proportional-fair allocation of the portion of time the transmission from each network node should be muted. When the quantity $\rho_{n,max}$ is determined e.g. according to what has been exemplified above, the disclosed method allows to determine the portion of time a first network node has to be muted in relation to the service said first network node provides within its service area and the interference said first network node generates within the serving area of at least a second network node.

The constraint $$\rho_n + \sum_{j \neq n} \alpha_{n,j} \rho_j \leq 1, \forall n,$$

represents the relation between the portion of time a first network node n has to be muted and the portion of time at least a second network node j has to be muted, where the coefficients $\alpha_{n,j} \in \{0,1\}$ represent the mutual interaction between a first network node n and a second network node j and can be determined according to what has been disclosed above.

The problem defined by expressions (4) and (5) is a convex optimization problem, with a continuous, twice differentiable and strictly concave objective function, and an affine set of constraints. Therefore, an optimal solution to this problem can be found either by inspecting the Karush-Kuhn-Tucker (KKT) conditions or with state-of-the-art optimization solvers. The disclosed method has the advantage that the portion of time each network node among a plurality of network nodes has to be muted according to any of the previous embodiments can be jointly optimized. A further advantage of this method is that it can be avoided that the transmission of any network node is muted for an unnecessary time.

In one embodiment, a network node n signals to at least a second network node and/or to a network control node one or more in the group of:
- the parameter $\rho_{n,max}$ representing an upper bound of the portion of time the transmission of said network node can be muted;
- the coefficients $\alpha_{n,j}$ representing the mutual interaction between said network node and at least a second network node j;
- the coefficients $m_n$ characterizing service area of network node n;
- the coefficient $m_{n,j}$ representing the portion of $m_n$ interfered by a second network node j.

This is particularly beneficial in densely deployed radio access network for determining the transmission muting patterns for a cluster of network nodes, such as a cluster of the small cells in LTE systems. In this case, the information needed to determine the muting time of each small cell can be exchanged among small cell nodes or collected by a network control node. The network control node can either be a node in the cluster for which muting time is to be determined and hence elected to the role of cluster head, or a separate node, such as a macro eNodeB overseeing the operation of a small cell cluster. The information can be signaled via physical layer signaling, e.g., shared data channel or a control channel, or through a dedicated interface for communication among network nodes, such as the X2 interface, exemplified for LTE.

The advantage of this method is to enable a network node and/or a network control node to compute the portion of time that one or more network nodes should be muted. This can be done, for instance, by locally reconstructing and solving the optimization problem defined above.

In another embodiment, a network control node determines the portion of time $\rho_n$, n=1, . . . , N that the transmission from each network node n within a group/cluster comprising N≥1 network nodes shall be muted. The network control node further signals the quantity $\rho_n$ to the associated network node n. The advantage of this method is to jointly determine the portion of muted transmission time for a plurality of network nodes taking into account how the muted transmission time affects the service of each network node as well as the cross-interaction among network nodes.

When the portion of time for muting the transmission has been determined for one or more network nodes in step 1 in FIG. 1, the muting pattern, i.e. when the network node is to be muted, is determined in step 2 in FIG. 1. The portion of time that a network node is to be muted can be divided into a number of sub-portions during some suitable the time period so that the total muting time equals the determined portion. The muting pattern can also be such that different resources of a network node are muted at different times.

In one embodiment, the transmission time muting pattern for at least a first network node is determined on the basis of one or more in the group of:
 The portion of time said at least one first network node shall be muted;
 The portion of time at least a second network node shall be muted;
 The transmission muting pattern of at least a second network node;
 The transmission muting conflict among a first and a second network nodes.

A transmission muting conflict in this context is as a set of one or more constraints indicating that simultaneous muting of the transmission from two network nodes having a transmission muting conflict should be either avoided or minimized. With reference to the above exemplified embodiment, if two network nodes n and j are characterized by $m_{n,j}>0$ and $m_{j,n}>0$, then it is not beneficial to mute these nodes simultaneously since each of the two network nodes would capitalize by transmitting when the other of the two network nodes is muted. Therefore, for each network node n a set of conflicting network nodes j can be identified, whose transmission should not be muted simultaneously (or at simultaneous muting should be minimized).

In dense radio access network deployments, the transmission muting pattern of a network node cannot be determined in isolation, but rather by considering the impact that the transmission muting pattern of one or more other network nodes has on its own service area as well as on the service areas of neighboring network nodes. Therefore, an advantage of the invention is that coordinated scheduling of transmission muting patterns (on/off transmission) among a plurality of network nodes is enabled. A further advantage of the present invention is that, by taking into account the portion of time each network node should be muted, it enables to avoid scheduling unnecessary transmission muting, thereby minimizing the network performance losses due to transmission muting.

In one embodiment of the invention, the scheduling of muting patterns of a plurality N≥1 of radio access nodes in a wireless communication system is determined in a centralized and/or coordinated manner. The benefit of this is to optimize the network operation and minimize performance losses due to the off-time of radio access nodes. The determined portion of time for muting a network node can be divided into a number of sub-portions of time, which can be distributed in said first muting pattern.

In one embodiment, the transmission time muting pattern of N≥1 network nodes is determined as a solution to the following integer linear programming:
Maximize $$\sum_{t=1}^{T} \sum_{n} y_{n,t} \quad (6)$$

subject to $$y_{n,t} + \sum_{j \neq n} b_{n,j} y_{j,t} \leq K_n, \forall n, t, \quad (7)$$

Where $$\frac{1}{T}\sum_{t=1}^{T} y_{n,t} \leq \rho_n, \forall n, \text{ and } y_{n,t} \in \{0, 1\}, \forall n, t.$$

This problem schedules transmission muting patterns of N≥1 network nodes over a given time horizon T with the variable $y_{n,t}=1$ if the network node n is muted at time t, and $y_{n,t}=0$ otherwise. The objective function of this problem aims at maximizing the number of muted network nodes at each time t, subject to two sets of constraints:
 The constraints set $$y_{n,t} + \sum_{j \neq n} b_{n,j} y_{j,t} \leq K_n, \forall n, t,$$

with $K_n$ positive integers, define the transmission muting conflict for each network node n at time t, i.e., at any time t and for any network node n. Up to $K_n$ conflicting network nodes can be muted simultaneously. In one example, $K_n$ is set to 1 so that either the network node n or one node j among the set of its conflicting network nodes can be muted. For a given network node n, the sets of conflicting network nodes is defined by the coefficients $b_{n,j}$, with $b_{n,j}=1$ if network node j is not to be muted at the same time as network node n, zero otherwise. In one example, the coefficients $b_{n,j}$ can be determined according to the above, for example as: $b_{n,j}=a_{n,j}$.
 The constraints set $$\frac{1}{T}\sum_{t=1}^{T} y_{n,t} \leq \rho_n \forall n$$

assures that total transmission muting time $$\left(\frac{1}{T}\sum_{t=1}^{T} y_{n,t}\right)$$

during a period T scheduled for each network node n does not exceed the portion $\rho_n$ of the period T determined according to the above.

The optimization problem in (4)-(5) can be solved for any given time horizon T, i.e., for a number of time instances t=1, . . . , T. For example, in LTE, the time instances may correspond to time slots, subframes, radio frames, or groups of radio frames. The above formulation assumes same time horizon T for all network nodes. The problem can also be formulated and solved for arbitrary time horizons $T_n$ for each, or groups of, network node using $$T = \max_n T_n.$$

Additional constraints may be added, for instance, to assure contiguity of the scheduled muting time for a certain node, e.g., to assure that a consecutive number of muted times are scheduled for a certain network node.

In a further embodiment of the invention, the following constraint is added to the optimization problem or used to replace other constraints:

$$y_{n,t} + \min\left\{1, \sum_{j\neq n} b_{n,j} y_{j,t}\right\} \leq 1, \forall n, t,$$

The advantage of using this constraint, for instance, to replace the constraint $$y_{n,t} + \sum_{j\neq n} b_{n,j} y_{j,t} \leq K_n, \forall n, t,$$

is to reduce the coupling of the transmission muting of network nodes that do not interfere with each other.

In one embodiment of the invention, a network node determines its transmission muting pattern according to any of the previous embodiments, and signals it to at least a second network node. The transmission muting pattern of a network node can, for example, be represented in the form of a bitmap, where each bit of said bitmap refers to a time instance. The benefit of this method is to enable each network node to determine autonomously its transmission muting pattern based on the available information at said network node, such as:
  the transmission muting patterns of other network nodes,
  the transmission muting conflict with other network nodes,
  the portion of time said network node is supposed to be muted.

According to one embodiment, transmission muting pattern for N≥1, given the associated fraction of muting time $\rho_n$ and time horizon $T_n$ for all nodes n=1, . . . , N, is determined according to the pseudo-algorithm 300 in FIG. 3. The benefit of the algorithm shown in FIG. 3 is that the computational complexity of determining the muting patterns of N≥1 network nodes can be reduced by solving a linear integer programming problem.

According to the algorithm shown in FIG. 3, following initial determination of calculation parameters in step 301, a set of barred nodes is computed in step 302 at the beginning of each iteration time t, i.e. network nodes that should be excluded in the following steps of the algorithm for time t. According to one example, the set of barred nodes at time t is initialized with network nodes that have already reached the target fraction of muting time, i.e., network nodes for which $$\frac{1}{T}\sum_{h=1}^{t-1} y_{n,h} \geq \rho_n,$$

or the target is reached within a certain threshold, e.g.

$$\left|\frac{1}{T}\sum_{h=1}^{t-1} y_{n,h} - \rho_n\right| \leq \varepsilon_n.$$

If it is determined that all nodes are barred at any iteration time t, the algorithm ends in step 306. Otherwise, the algorithm finds a candidate node to be muted at time t, step 303, and updates the set of barred nodes for time t, step 304. Steps 303, 304 are repeated until all nodes are barred at time t. A prerequisite for a network node to be eligible for muting at time t is that said network node is not barred for time t. A network node to be muted can then be selected according to some suitable criterion, such as:
  Selecting the network node with the largest difference between scheduled muting time and the target muting time, i.e., select $$n = \underset{j\notin barred\ nodes}{\operatorname{argmax}} \left|\frac{1}{T}\sum_{h=1}^{t-1} y_{j,h} - \rho_j\right|.$$

Selecting the network node with the smallest difference between the scheduled muting time and the target muting time, i.e., select $$n = \underset{j\notin barred\ nodes}{\operatorname{argmin}} \left|\frac{1}{T}\sum_{h=1}^{t-1} y_{j,h} - \rho_j\right|.$$

When a network node n to be muted at time t has been selected, the set of barred nodes for time t is updated by adding said selected network node, as well as all network nodes j whose transmission muting conflicts with the transmission muting of network node n.

In step 306 the scheduled muting time is updated for all network nodes up to time t. A termination criterion is then verified. For instance, if after time t all network nodes have received a sufficient amount of muting time, the algorithm terminates, otherwise it starts a new iteration for a next time step t=t+1. The termination criteria can, for example, verify whether the following constraints are fulfilled for all network nodes after time t:

$$\left| \frac{1}{T} \sum_{h=1}^{t-1} y_{n,h} - \rho_n \right| \leq \varepsilon_n \text{ for all } n = 1, \ldots, N \text{ or}$$

$$T_n \leq t \text{ for all } n = 1, \ldots, N.$$

Consequently, when the algorithm is ended muting patterns have been determined for all network nodes N, and where the muting patterns are determined taking muting patterns of other network nodes into consideration.

In sum, the present invention provides a solution that mitigates inter-cell interference, and hence improves the spectral efficiency, in the service area of neighboring network nodes. Muting inherently reduces the spectral efficiency in the service area of the muted network node, but according to the solution of the present invention the impact of conflicting effects is optimized by the possibility of determining transmission muting patterns among a group of network nodes so as to maximize the "on-time" of each network node while assuring that a sufficient number of time-resources are muted to protect the transmission to user nodes in the service area of neighboring network nodes that suffer strong interference.

The present invention may be used in any suitable wireless communication system for interference mitigation. Examples of such suitable systems are radio cellular networks, heterogeneous networks, and radio access networks.

Moreover, as understood by the person skilled in the art, any method according to the present invention may be implemented in a computer program, having code means, which when run by processing means causes the processing means to execute the steps of the method. The computer program is included in a computer readable medium of a computer program product. The computer readable medium may comprises of essentially any non-transitory memory, such as a ROM (Read-Only Memory), a PROM (Programmable Read-Only Memory), an EPROM (Erasable PROM), a Flash memory, an EEPROM (Electrically Erasable PROM), or a hard disk drive.

Finally, it should be understood that the present invention is not limited to the embodiments described above, but also relates to and incorporates all embodiments within the scope of the appended independent claims.

The invention claimed is:

1. A method in a wireless communication system, the wireless communication system comprising a plurality of network nodes for providing access to user nodes, the method comprising, when transmission from a first network node among the plurality of network nodes of the wireless communication system is to be muted:
determining, by a network control node among the plurality of network nodes for the first network node, a first portion of time for muting transmission from the first network node based on a second portion of time for muting transmission from a second network node among the plurality of network nodes and a third portion of time for muting transmission from a third network node among the plurality of network nodes; and
based on the first portion of time, a second muting pattern for muting transmission from the second network node, and a third muting pattern for muting transmission from the third network node, determining, by the network control node, a first muting pattern for muting transmission from the first network node, wherein:
determining the first portion of time for muting the first network node includes determining a maximum limit ($P_{n,max}$) of the first portion of time, and
the maximum limit ($P_{n,max}$) of the first portion of time is defined by one from the group:

$$\rho_{n,max} = 1 - \frac{m_n}{m_n + \max_{j \neq n} m_{j,n}},$$

$$\rho_{n,max} = 1 - \frac{m_n}{m_n + \min_{j \neq n} m_{j,n}}, \text{ or}$$

$$\rho_{n,max} = 1 - \frac{m_n}{m_n + avg\{m_{j,n}\}}_{j \neq n},$$

wherein:
$m_n$ is a parameter characterizing a service area of the first network node (n), and
$m_{j,n}$ is a parameter representing interference caused by the first network node (n) within a service area of the second network node (j).

2. The method according to claim 1, wherein determining the first portion of time for muting transmission from the first network node is further based on a first condition relating to the second network node, the first condition including at least one of:
interference caused by the first network node within a serving area of the second network node,
interference caused by the second network node within a service area of the first network node,
an amount and/or type of traffic the second network node provides within the service area of the second network node, or
the second muting pattern of the second network node.

3. The method according to claim 1, wherein determining the first portion of time for muting transmission from the first network node is based on a service provided by the first network node, including an amount and/or type of traffic the first network node supports within a service area of the first network node.

4. The method according to claim 1, further comprising:
determining the second portion of time for muting transmission from the second network node, and
based on the second portion of time, determining the second muting pattern for muting transmission from the second network node.

5. The method according to claim 4, further comprising:
determining one of the second portion of time and the third portion of time based on a determination of the other one of the second portion of time and the third portion of time.

6. The method according to claim 1, wherein the maximum limit of the first portion of time is based on a load of the first network node.

7. The method according to claim 1, wherein determining the first portion of time for muting the first network node is based on traffic in the second network node.

8. The method according to claim 1, wherein the parameter $m_n$ represents a service requested from the first network node.

9. The method according to claim 8, wherein the parameter $m_n$ indicates traffic of the first network node.

10. The method according to claim 9, wherein the parameter $m_n$ is represented by at least one of:

a number of, or average number of, mobile nodes served by the first network node, a number of, or average number of, active mobile nodes within the service area of the first network node, traffic, or average traffic, supported in the service area of the first network node, or traffic, or average traffic, demand in the service area of the first network node.

11. The method according to claim 1, wherein the interference corresponds to at least one of:

a number, or average number, of mobile nodes served by the first network node and interfered with by the second network node, a number, or average number, of active mobile nodes within the service area of the first network node and interfered with by the second network node, traffic, or average traffic, supported in the service area of the first network node and interfered with by the second network node, or traffic, or average traffic, demand in the service area of the first network node interfered with by the second network node.

12. The method according to claim 1, further comprising:

signaling to the second network node and/or to/from the network control node at least one of:

a parameter representing the maximum limit of the first portion of time for muting the transmission of the first network node, a representation of mutual interaction between the first network node and the second network node, a coefficient characterizing the service area of the first network node, or a coefficient representing a portion of the service area of the first network node that is interfered with by the second network node.

13. The method according to claim 1, further comprising:

signaling the first muting pattern to at least one network node among the plurality of network nodes which is subjected to interference from the first network node.

14. The method according to claim 1, further comprising: transmitting, by the network control node, the first portion of time to the first network node.

15. The method according to claim 1, further comprising:

scheduling muting patterns of a first group of network nodes among the plurality of network nodes, where muting patterns of at least one other network node among the plurality of network nodes is considered when scheduling the first muting pattern for the first network node.

16. The method according to claim 1, wherein determining the first muting pattern for muting transmission from the first network node is further based on at least one of:

the second portion of time for muting transmission from the second network node, or a number of network nodes among the plurality of network nodes for which simultaneous muting is scheduled, wherein at least one of the second network node and third network node are subjected to interference from the first network node and/or subject the first network node to interference.

17. The method according to claim 1, further comprising:

when determining muting patterns of at least one of the first network node and the second network node, and when a service provided by one of the first network node and the second network node is interfered with by another service provided by the other of the first network node and the second network node: scheduling muting patterns of the first network node and the second network node such that the muting patterns are at least partly non-overlapping in time.

18. The method according to claim 1, further comprising:

receiving the second muting pattern of the second network node.

19. A network control node for use in a wireless communication system, the network control node comprising:

a memory; and at least one processor configured to execute instructions included in the memory to, when transmission from a first network node of the wireless communication system is to be muted:

determine, for the first network node, a first portion of time for muting transmission from the first network node based on a second portion of time for muting transmission from a second network node of the wireless communication system and a third portion of time for muting transmission from a third network node of the wireless communication system; and based on the first portion of time, a second muting pattern for muting transmission from the second network node, and a third muting pattern for muting transmission from the third network node, determine a first muting pattern for muting transmission from the first network node;

wherein:

determining the first portion of time for muting the first network node includes determining a maximum limit ($P_{n,max}$) of the first portion of time, and the maximum limit ($P_{n,max}$) of the first portion of time is defined by one from the group:

$$\rho_{n,max} = 1 - \frac{m_n}{m_n + \max_{j \neq n} m_{j,n}},$$

$$\rho_{n,max} = 1 - \frac{m_n}{m_n + \min_{j \neq n} m_{j,n}}, \text{ or}$$

$$\rho_{n,max} = 1 - \frac{m_n}{m_n + avg\{m_{j,n}\}},$$

wherein:

$m_n$ is a parameter characterizing a service area of the first network node (n), and $m_{j,n}$ is a parameter representing interference caused by the first network node (n) within a service area of the second network node (j).

* * * * *